United States Patent
Perry

(10) Patent No.: US 9,517,804 B2
(45) Date of Patent: Dec. 13, 2016

(54) NOTIFICATION SYSTEM FOR A VEHICLE ASSEMBLY PROCESS AT AN ASSEMBLY PLANT AND A METHOD

(71) Applicant: GM GLOBAL TECHNOLOGY OPERATIONS LLC, Detroit, MI (US)

(72) Inventor: Tamara E Perry, Swartz Creek, MI (US)

(73) Assignee: GM Global Technology Operations LLC, Detroit, MI (US)

(*) Notice: Subject to any disclaimer, the term of this patent is extended or adjusted under 35 U.S.C. 154(b) by 40 days.

(21) Appl. No.: 14/597,282

(22) Filed: Jan. 15, 2015

(65) Prior Publication Data
US 2016/0207578 A1    Jul. 21, 2016

(51) Int. Cl.
| | |
|---|---|
| *F16L 33/00* | (2006.01) |
| *B62D 65/00* | (2006.01) |
| *H04B 5/00* | (2006.01) |
| *F16L 19/00* | (2006.01) |
| *F16L 11/00* | (2006.01) |
| *B65C 7/00* | (2006.01) |
| *F16L 13/00* | (2006.01) |

(52) U.S. Cl.
CPC .......... *B62D 65/005* (2013.01); *F16L 33/00* (2013.01); *H04B 5/0062* (2013.01); *B65C 7/00* (2013.01); *F16L 11/00* (2013.01); *F16L 13/00* (2013.01); *F16L 19/00* (2013.01); *Y10T 29/49826* (2015.01)

(58) Field of Classification Search
CPC ...................................................... F16L 33/00
USPC ........................................................ 138/104
See application file for complete search history.

(56) References Cited

U.S. PATENT DOCUMENTS

| | | | | |
|---|---|---|---|---|
| 5,749,603 A | * | 5/1998 | Mann ....................... | F16L 33/03 24/20 R |
| 2005/0149216 A1 | * | 7/2005 | Popplewell ............ | G05B 19/12 700/96 |
| 2014/0253333 A1 | * | 9/2014 | Patterson ............ | E05B 73/0064 340/572.4 |

FOREIGN PATENT DOCUMENTS

| | | |
|---|---|---|
| DE | 102007047279 A1 | 4/2009 |
| DE | 102010042535 A1 | 4/2012 |

OTHER PUBLICATIONS

Article entitled "Radio-frequency identification" from the Wikipedia website page: https://en.wikipedia.org/wiki/Radio-frequency_identification; download date: Jan. 2, 2015; 27 pages.

* cited by examiner

*Primary Examiner* — Steven Lim
*Assistant Examiner* — Benyam Haile
(74) *Attorney, Agent, or Firm* — Quinn Law Group, PLLC

(57) ABSTRACT

A notification system for a vehicle assembly process at an assembly plant includes a base unit of a vehicle at the assembly plant and a first component coupled to the base unit at a station in the assembly plant to further define the vehicle. A tag is coupled to one of the base unit and the first component. A reader is disposed downstream from the station at the assembly plant. The reader is configured to detect if the tag is coupled to one of the base unit and the first component when the vehicle is scanned by the reader. Furthermore, a method of notifying a user during the vehicle assembly process at the assembly plant includes scanning the vehicle, via the reader that is disposed downstream from the station at the assembly plant, to detect if the tag is coupled to one of the base unit and the first component.

20 Claims, 2 Drawing Sheets

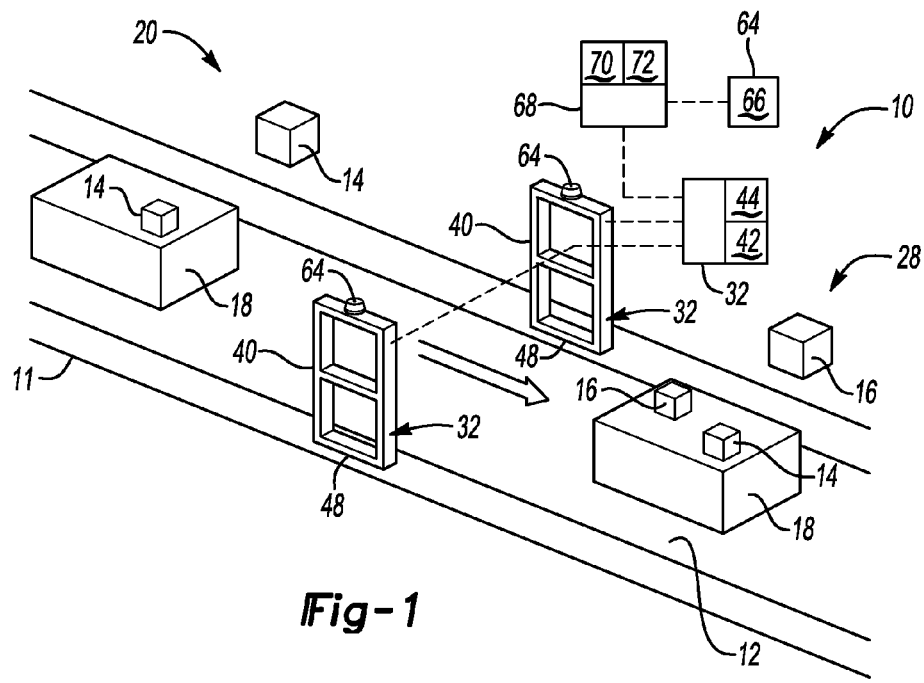
Fig-1
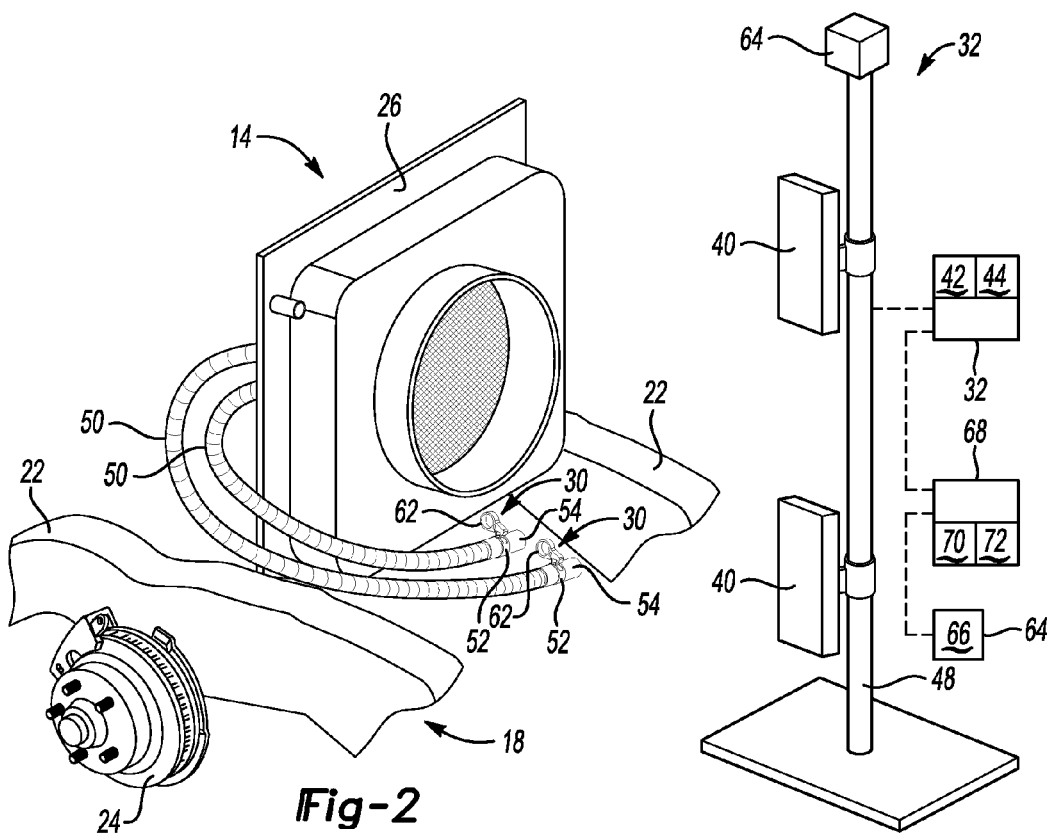
Fig-2
Fig-7

NOTIFICATION SYSTEM FOR A VEHICLE ASSEMBLY PROCESS AT AN ASSEMBLY PLANT AND A METHOD

TECHNICAL FIELD

The present disclosure relates to a notification system for a vehicle assembly process at an assembly plant and a method of notifying a user about a vehicle during the vehicle assembly process at the assembly plant.

BACKGROUND

A vehicle is generally assembled at an assembly plant. Many components are coupled together to form the vehicle. Various assembly procedures have been developed to assist with the assembly of hoses with components.

For example, a hose clamp surrounds a hose and a pop clamp is utilized to hold the hose clamp open. Once the hose is positioned on a component of the vehicle, the pop clamp is removed by an operator or user which causes the hose clamp to clamp around the hose. The operator then places the pop clamp in a hopper. The hopper can count when the pop clamp is placed therein. However, the hopper cannot distinguish between different objects, so if an object other than the pop clamp is placed therein, the hopper will count it.

As another example, some hose clamps do not use the pop clamp discussed above. Instead, the hose clamp stays open by a tab integrated on the hose clamp. Once the hose is positioned on the component of the vehicle, the user utilizes a tool that releases the tab which causes the hose clamp to clamp around the hose. The tool is removed from a sleeve when being utilized and is placed back in the sleeve once the task is complete at that particular assembly station. The sleeve can identify when the tool is removed and placed back in the sleeve. However, the tool cannot identify whether all of the hose clamps have been released at that station.

Another type of tool that can be utilized to release the tab of the hose clamps is an electric tool that can identify if the tool has been used to release the tab. However, this tool cannot identify if another part has been engaged instead of the tab.

As yet another example, a camera system has been developed that can visually identify the pop clamp. The camera system is set up after a particular assembly station, and as the vehicle moves along the assembly line past the camera system, the camera system visually looks at the vehicle. If the camera system can visually see the pop clamp, the camera system will indicate to the operator that the pop clamp needs to be removed and the operator will then remove that pop clamp. However, the camera system cannot visually see every location of the vehicle.

Other hose clamps include a threaded screw and a band to clamp the hose clamp around the hose. An electric torque controlled tool threads the screw which tightens the band around the hose. These tools cannot identify whether all of the hose clamps have been tightened and are cumbersome to use.

SUMMARY

The present disclosure provides a notification system for a vehicle assembly process at an assembly plant. The system includes a base unit of a vehicle located in the assembly plant and a first component coupled to the base unit at a station in the assembly plant to further define the vehicle. The system further includes a tag coupled to one of the base unit and the first component. The system also includes a reader disposed downstream from the station at the assembly plant. The reader is configured to detect if the tag is coupled to one of the base unit and the first component when the vehicle is scanned by the reader.

The present disclosure provides another notification system for a vehicle assembly process at an assembly plant. A base unit of a vehicle is located in the assembly plant and a first component is coupled to the base unit at a station in the assembly plant to further define the vehicle. A hose is coupled to one of the base unit and the first component to further define the vehicle. A hose clamp surrounds an end portion of the hose. A tag includes a body configured as a clip, with the clip being engagable with the hose clamp to hold the hose clamp open. The clip is removable from the hose clamp after connecting the end portion of the hose to cause the hose clamp to contract around the end portion of the hose and secure the hose to one of the base unit and the first component. A reader is disposed downstream from the station at the assembly plant and configured to detect the tag. A failure of the reader to detect the tag when the vehicle is scanned by the reader is indicative of the hose clamp being released to clamp the hose to one of the base unit and the first component.

The present disclosure also provides a method of notifying a user about a vehicle during a vehicle assembly process at an assembly plant. The method includes providing a base unit of the vehicle as part of the vehicle assembly process at the assembly plant and coupling a first component to the base unit at a station in the assembly plant to further assemble the vehicle. The method also includes coupling a tag to one of the base unit and the first component. The method further includes scanning the vehicle, via a reader that is disposed downstream from the station at the assembly plant, to detect if the tag is coupled to one of the base unit and the first component.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic perspective view of a notification system disposed along an assembly line, with components of a vehicle at one station and illustrating the progression of those components to another station with a reader disposed between the stations.

FIG. 2 is a schematic fragmentary view of a base unit and a first component coupled together to further define the vehicle.

FIG. 7 is a schematic perspective view of another configuration of a reader.

DETAILED DESCRIPTION

Figure 3:
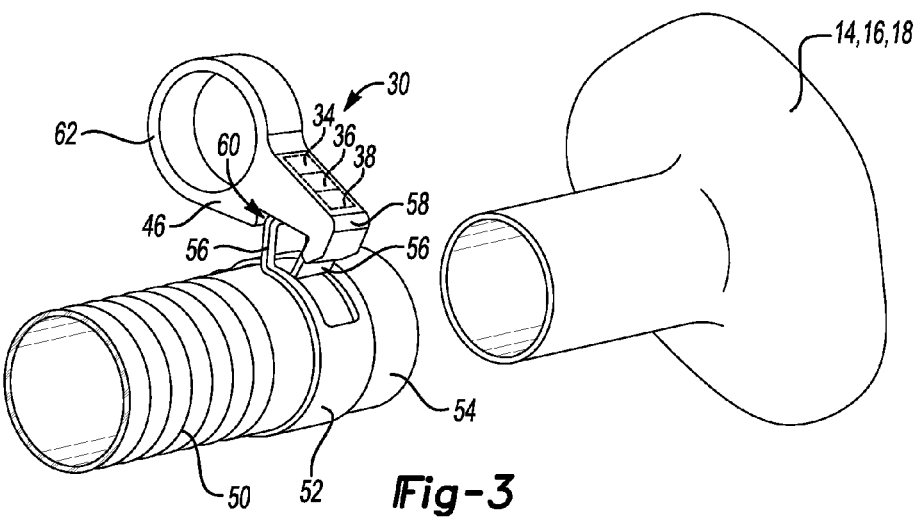
FIG. 3 is a schematic exploded-fragmentary perspective view of a component of the vehicle and a hose with a hose clamp therearound, and with a clip holding the hose clamp open.

Referring to the Figures, wherein like numerals indicate like or corresponding parts throughout the several views, a notification system 10 for a vehicle assembly process at an assembly plant 11 is generally shown in FIG. 1. The notification system 10 can be disposed along an assembly line 12 of the vehicle assembly process as shown in FIG. 1. The notification system 10 can improve the assembly process by confirming various assembly procedures have occurred.

Generally, many components 14, 16, e.g., parts, subsystems, etc., are assembled together to form a vehicle, and these components 14, 16 are assembled together at the assembly plant 11 to form the vehicle. Various components, e.g., parts, subsystems, etc., can be preassembled before arriving at the assembly plant 11, and these preassembled components can then be coupled to various other components of the vehicle during the vehicle assembly process. Furthermore, various individual components or parts can be coupled to various components of the vehicle during the vehicle assembly process.

The notification system 10 includes a base unit 18 of the vehicle located in the assembly plant 11 and a first component 14 coupled to the base unit 18 at a station 20 in the assembly plant 11 to further define the vehicle. The base unit 18 can be one or more components of the vehicle. Therefore, for example, the base unit 18 can be a frame 22 or support structure, as shown in FIG. 2, etc. The first component 14 can be any component that is coupled to another component of the vehicle to further define the vehicle. Therefore, for example, the first component 14 can be a radiator 26, as shown in FIG. 2, a power steering mechanism, etc. The base unit 18 and the first component 14 are shown schematically in FIG. 1 since the base unit 18 and the first component 14 can be any component of the vehicle. FIG. 2 illustrates one example of the base unit 18 being the frame 22 with a wheel hub 24 coupled thereto, and one example of the first component 14 being the radiator 26.

Simply stated, the base unit 18 of FIG. 1 is the component (s) of the vehicle that arrive at the station 20 of the first component 14. Therefore, after the first component 14 is coupled to the base unit 18 at the station 20 of FIG. 1, the vehicle moves to a next station 28, the first component 14 is incorporated with the base unit 18 to further assemble the vehicle. As such, at the next station 28, a second component 16 is coupled to the updated base unit 18, and so on for any preceding station(s) along the assembly line 12. The second component 16 can be any component that is coupled to another component of the vehicle to further define the vehicle. It is to be appreciated that the second component 16 can be any suitable configuration, and thus can be configured the same or differently from the first component 14. For example, the first and second components 14, 16 can be seats that are configured the same, or alternatively, the first component 14 can be a radiator 26 and the second component 16 can be a pump.

Generally, a plurality of vehicles are assembled at the assembly plant 11. The same or different types of vehicles can be assembled along the same assembly line 12. Therefore, a plurality of components 14, 16 are disposed at each station 20 awaiting coupling to the base unit 18 of each vehicle. As such, the first component 14 can be further defined as a plurality of first components 14 that are disposed at one station 20 to await assembly to another base unit 18 and the second component 16 can be further defined as a plurality of second components 16 that are disposed at the same station 20 or a different station 28 to await assembly to another base unit 18. FIG. 1 illustrates the next first component 14 disposed adjacent to the assembly line 12 at the station 20 awaiting assembly to the next base unit 18 and also illustrates the next second component 16 disposed adjacent to the assembly line 12 at the next station 28 awaiting assembly to the next base unit 18. It is to be appreciated that pallets or bins of components 14, 16 can be disposed at the stations 20.

Optionally, one or more of the stations 20 can assemble more than one component 14, 16 to the base unit 18. Therefore, for example, the first components 14 and the second components 16 can be combined into a single station 20 with both of these components 14, 16 assembled to the base unit 18 at that station 20. Alternatively, the first and second components 14, 16 can be combined into a single station 20 but an operator or user chooses either the first component 14 to couple to that particular base unit 18 or chooses the second component 16 to couple to that particular base unit 18. To illustrate such a situation, when the first component 14 is a rear view mirror for a particular car and the second component 16 is a rear view mirror for a particular truck, the operator chooses one or the other depending on the particular base unit 18 at that station 20.

Referring to FIG. 2, the notification system 10 further includes a tag 30 coupled to one of the base unit 18 and the first component 14. For example, coupling the tag 30 to one of the base unit 18 and the first component 14 can be via attaching the tag 30 by any suitable method, some of which can be fastener(s), clip(s), adhesive, welding, molding, etc. As another example, coupling the tag 30 to one of the base unit 18 and the first component 14 can be via embedding or integrally forming at one piece, etc., the tag 30 into one of the base unit 18 and the first component 14.

The notification system 10 also includes a reader 32 disposed downstream from the station 20 at the assembly plant 11, as shown in FIG. 1. The reader 32 is configured to detect the tag 30. For example, the reader 32 is configured to detect if the tag 30 is coupled to one of the base unit 18 and the first component 14 when the vehicle is scanned by the reader 32. The tag 30 and the reader 32 cooperate with each other such that information can be communicated therebetween. The tag 30 and the reader 32 can communicate with each other by any suitable devices, mechanisms, methods, etc., and various non-limiting examples are discussed below.

Generally, the tag 30 and the reader 32 can communicate with each other through an active system or a passive system. It is to be appreciated that a plurality of tags 30 can be utilized along the vehicle assembly process and/or a plurality of readers 32 can be utilized along the vehicle assembly process. Therefore, readers 32 can be set up at various stages of assembly of the vehicle to minimize downtime of the vehicle assembly process.

In certain embodiments, the tag 30 is a transponder, and the transponder communicates with the reader 32. The transponder can send an identifying signal in response to a signal sent by the reader 32. Therefore, various information can be sent/received between the tag 30 and the reader 32.

The tag 30 can include a microchip 34 as best shown in FIGS. 3-6. The microchip 34 is configured to store information, and therefore, can include a memory 36 for storing information. Depending on the type of active or passive system that is being utilized, optionally, the microchip 34 can include a battery 38 (this optional battery 38 is shown in FIG. 3 only) such that the tag 30 can emit a signal. Therefore, the tag 30 can be powered or unpowered.

In certain embodiments, the reader 32 can include a transceiver that receives a signal when the microchip 34 is detected. For example, the reader 32 can include an antenna 40, as shown in FIGS. 1 and 7, that receives a signal when the microchip 34 is detected. Therefore, when the reader 32 scans the vehicle, the antenna 40 sends out a signal that the microchip 34 can identify and the tag 30 sends information back to the antenna 40, and thus the reader 32. For example, in certain embodiments, the tag 30 and the reader 32 communicate with each other utilizing radio frequency identification (RFID). For this example, the antenna 40 of the reader 32 sends out a radio frequency that activates the microchip 34 to send information back to the antenna 40 and thus the reader 32. Therefore, in certain embodiments, active RFID or passive RFID can be utilized.

The reader 32 can include a processor 42 and a memory 44 on which is recorded instructions for communicating information regarding the tag 30. The reader 32 is configured to execute the instructions from the memory 44, via the processor 42. The memory 44 can be, tangible, non-transitory computer-readable memory such as read-only memory (ROM) or flash memory. The reader 32 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the reader 32 can include all software, hardware, memory 44, algorithms, connections, sensors, etc., necessary to execute instructions based on the information received from the tag 30.

Figure 4:
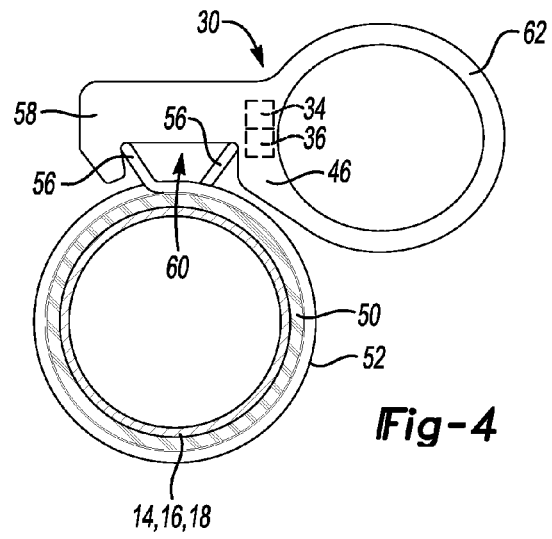
FIG. 4 is a schematic partial cross-sectional view of the clip holding the hose clamp open with the hose surrounding a portion of the component from FIG. 3.
Figure 5:
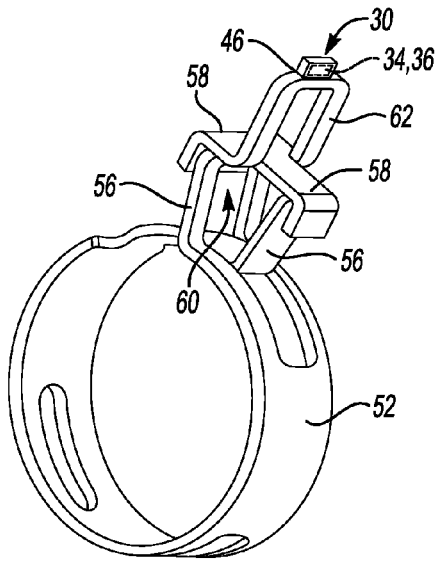
FIG. 5 is a schematic perspective view of another configuration of a clip.

Generally, the tag 30 can be any suitable configuration. For example, the tag 30 can be embedded in a body 46 as shown in FIGS. 2-6. The body 46 can be in any suitable configuration and FIGS. 4 and 5 illustrate two different examples of the body 46. FIG. 4 illustrates the tag 30 embedded in the body 46 or integrally formed as one piece with the body 46. As shown in FIG. 5, the tag 30 can be attached to the body 46. The tag 30 can be attached to the body 46 by any suitable method, such as adhesive, molding, fastener(s), welding, etc.

Furthermore, the tag 30 can be attached or embedded in any component of the vehicle. For example, the tag 30 can be attached or embedded in a rear-view mirror, airbag assemblies, a steering wheel, seat(s), an instrument panel, the radiator 26, a transmission, a final drive, an engine, a clip, etc. Therefore, the body 46 can be configured as any suitable component(s) of the vehicle, some of which are discussed immediately above.

The reader 32 can be disposed downstream to one or more stations 20, 28 as shown in FIG. 1. Therefore, for example, components 14, 16 at a plurality of stations 20, 28 can be coupled to the vehicle and then the reader 32 can be utilized to scan the vehicle. The vehicle can be scanned by the reader 32 in any suitable method. For example, the vehicle can move past a stationary reader 32, the reader 32 can move past a stationary vehicle or both the reader 32 and the vehicle can move relative to each other. As another example, the reader 32 can be a hand-held wand, etc., and the operator moves the wand relative to the vehicle.

Examples of the stationary reader 32 are shown in the Figures for illustrative purposes, and are not to be limiting. As indicated above, the reader 32 can be any suitable configuration, and therefore, two different examples are shown in the Figures for illustrative purposes. For example, as shown in FIG. 7, the reader 32 can also include a stand 48, and the antenna 40 can be supported by the stand 48. As also shown in FIG. 7, the antenna 40 can be defined as a plurality of antennas 40 spaced from each other and each supported by the stand 48. As another example, the stand 48 can be defined as a plurality of stands 48 which can be configured differently from FIG. 7. At least one antenna 40 can be supported by one of the stands 48 and at least one antenna 40 can be supported by another one of the stands 48. The stands 48 and/or antennas 40 of FIG. 1 can be spaced from each other and substantially align with each other. Optionally, the antennas 40 of FIG. 1 can be incorporated inside the stands 48 or the stands 48 can be eliminated. The vehicle, whether fully assembled or not, can pass between the stands 48 of FIG. 1.

A hose 50, as best shown in FIG. 3, can be coupled to one of the base unit 18 and the first component 14 to further define the vehicle. As such, the hose 50 can be another component of the vehicle. In certain embodiments, one end of the hose 50 can be preassembled to the first component 14 while another end of the hose 50 is to be attached to the base unit 18 after the first component 14 is coupled to the base unit 18. Alternatively, both ends of the hose 50 can be assembled to one or more components 14, 16 at the station 20. A plurality of hoses 50 can be utilized along the vehicle assembly process as shown in FIG. 2.

Continuing with FIG. 2, a hose clamp 52 can surround an end portion 54 of the hose 50. As shown in FIG. 2, one hose clamp 52 can surround the end portion 54 of one hose 50 and another hose clamp 52 can surround the end portion 54 of another hose 50. The hose clamps 52 are held open until the end portion 54 of the respective hoses 50 are coupled to the desired component(s). Therefore, in certain embodiments, the body 46 is configured as the clip. The clip is engagable with the hose clamp 52 to hold the hose clamp 52 open. Specifically, the clip engages the hose clamp 52 to hold the hose clamp 52 open to connect the end portion 54 of the hose 50 with one of the base unit 18 and the first component 14. As discussed above, the tag 30 is attached or embedded in the body 46, and therefore, the hose clamp 52 is tagged when the clip is holding the hose clamp 52 open. As such, FIG. 2 illustrates two hose clamps 52 being held open by clips, and thus, these hose clamps 52 are tagged.

Figure 6:
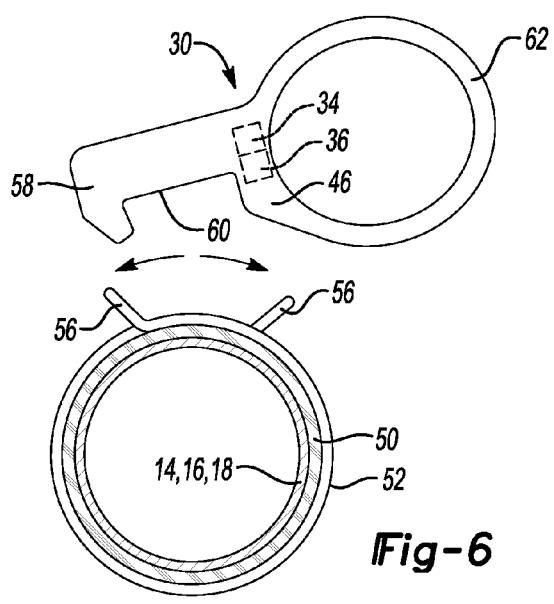
FIG. 6 is a schematic partial cross-sectional view of the clip removed from the hose clamp with the hose clamp contracted around the hose and the portion of the component from FIG. 4.

Referring to FIG. 6, to release the hose clamp 52 and secure the hose 50 to the base unit 18 or another component, the clip is removed from the hose clamp 52. The clip is removable from the hose clamp 52 after connecting the end portion 54 of the hose 50 to cause the hose clamp 52 to contract around the end portion 54 of the hose 50 and secure the hose 50 to one of the base unit 18 and the first component 14. Therefore, the hose clamp 52 is biased open when the clip is connected thereto and the hose clamp 52 is biased closed when the clip releases the hose clamp 52. A failure of the reader 32 to detect the tag 30 when the vehicle is scanned by the reader 32 is indicative of the hose clamp 52 being released to clamp the hose 50 to one of the base unit 18 and the first component 14. Said differently, the reader 32 does not detect the tag 30 when the vehicle is scanned by the reader 32 due to the removal of the clip which indicates that the hose clamp 52 is released to clamp the hose 50 to one of the base unit 18 and the first component 14. Therefore, the clip will not be in the vehicle as the vehicle moves to the next station 28 and the reader 32 will not detect that removed clip.

In certain embodiments, the hose clamp 52 can include a pair of tabs 56 or ears, and the clip can include a finger 58 defining a recess 60 that receives the tabs 56 to hold the hose clamp 52 open. The clip can also include a handle 62 for grasping to remove the clip from the hose clamp 52. Generally, the finger 58 extends outwardly away from the handle 62. The handle 62 can be any suitable configuration, and non-limiting examples are shown in FIG. 2-6 in which the handle 62 is a ring. The handle 62 can be configured ergonomically to minimize fatigue, and the ring is one example.

The microchip 34 can be embedded in at least one of the finger 58 and the handle 62. In one embodiment, the microchip 34 is embedded in the finger 58. In another embodiment, the microchip 34 is embedded in the handle 62. In yet another embodiment, the microchip 34 is partially embedded in the finger 58 and partially embedded in the handle 62. Alternatively, the microchip 34 can be attached to at least one of the finger 58 and the handle 62. Therefore, the microchip 34 can be any suitable location along the clip.

Referring to FIGS. 1 and 7, the reader 32 can include an indicator 64 that is activated if the reader 32 detects the tag 30 when the vehicle is being scanned by the reader 32. Therefore, the indicator 64 can be in communication with the reader 32 to cue the operator that the vehicle needs to be looked at. When the indicator 64 cues the operator, optionally, the assembly line 12 can stop. The indicator 64 can be in any suitable form and a few non-limiting examples are discussed below. For example, the indicator 64 can be a visible light, i.e., a light lights up as a visual indicator. As another example, the indicator 64 can be an audible mechanism, i.e., an audible noise that can be heard as an audible indicator. As yet another example, the indicator 64 can be a display 66, i.e., information is displayed on a screen. It is to be appreciated that more than one indicator 64 can be utilized, therefore, for example, more than one of the visible light, the audible mechanism and/or the display 66 can be utilized together.

In certain embodiments, a computer 68 can be in communication with the reader 32. When the indicator 64 is the display 66, the display 66 can be in communication with the computer 68 to convey information regarding the tag 30. Alternatively, the display 66 can be in communication with the reader 32, instead of the computer 68, to convey information regarding the tag 30. The computer 68 includes a processor 70 and a memory 72 on which is recorded instructions for communicating information regarding the tag 30. The computer 68 is configured to execute the instructions from the memory 72, via the processor 70. For example, the computer 68 can be a host machine or distributed system, e.g., a computer 68 such as a digital computer 68 or microcomputer. The memory 72 can be, tangible, non-transitory computer-readable memory such as read-only memory (ROM) or flash memory. The computer 68 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the computer 68 can include all software, hardware, memory 72, algorithms, connections, sensors, etc., necessary to execute instructions based on the information received from the tag 30.

The present disclosure also provides a method of notifying the user or operator about the vehicle during the vehicle assembly process at the assembly plant 11. For example, various assembly procedures can be confirmed before the assembled vehicle leaves the assembly plant 11. The method includes providing the base unit 18 of the vehicle as part of the vehicle assembly process at the assembly plant 11. As discussed above, the base unit 18 can be one or more components of the vehicle.

The method also includes coupling the first component 14 to the base unit 18 at the station 20 in the assembly plant 11 to further assemble the vehicle, and coupling the tag 30 to one of the base unit 18 and the first component 14. In certain embodiments, coupling the tag 30 to one of the base unit 18 and the first component 14 can be further defined as coupling the tag 30 to one of the base unit 18 and the first component 14 prior to coupling the first component 14 to the base unit 18 at the station 20. Therefore, the base unit 18 and/or the first component 14 can arrive at the assembly plant 11 with the tag 30 already attached/embedded, etc. Alternatively, at the assembly plant 11, the tag 30 can be attached to the base unit 18 and/or the first component 14 before or when coupling the base unit 18 and the first component 14 together.

The method further includes scanning the vehicle, via the reader 32 that is disposed downstream from the station 20 at the assembly plant 11, to detect if the tag 30 is coupled to one of the base unit 18 and the first component 14. Depending on the desired outcome when the vehicle is scanned, the vehicle can, for example, proceed to the next station 28 or be stopped for further analysis. The outcomes are discussed further below.

The method can also include engaging the clip with the hose clamp 52 that surrounds the end portion 54 of the hose 50 to hold the hose clamp 52 open and connecting the end portion 54 of the hose 50 with one of the base unit 18 and the first component 14 as the clip holds the hose clamp 52 open. Once the hose 50 is positioned as desired, the clip can be removed to release the hose clamp 52. Therefore, the method can also include removing the clip from the hose clamp 52 after connecting the end portion 54 of the hose 50 to cause the hose clamp 52 to contract around the end portion 54 of the hose 50 and secure the hose 50 to one of the base unit 18 and the first component 14. The clip can be preassembled to the hose clamp 52 before arriving at the assembly plant 11 or the clip can be preassembled to the hose clamp 52 at the assembly plant 11. Alternatively, the clip can be coupled to the hose clamp 52 just prior to coupling the hose 50 to one of the components 14, 16 of the vehicle. Optionally, the removed clips can then be placed in a hopper that counts the clips that have been removed. It is to be appreciated that the removed clips can be reused, thus providing cost savings.

When it is desirable to confirm that the tags 30 have been removed from the vehicle during assembly, the reader 32 can indicate to the operator when one or more tags 30 are detected. As such, when the vehicle progresses through one or more stations 20, 28, the reader 32 can be positioned in a desired location to determine whether any tag 30 that was supposed to be removed from the vehicle remains. Therefore, scanning the vehicle via the reader 32 occurs after removing the clip from the hose clamp 52. Generally, the reader 32 can compare an expected response with an actual response and outputs an appropriate response.

A failure of the reader 32 to detect the tag 30 when the vehicle is being scanned by the reader 32 is indicative of the hose clamp 52 being released to clamp the hose 50 to one of the base unit 18 and the first component 14, and the vehicle passes to the next station 28. Said differently, the vehicle passes to the next station 28 if the reader 32 does not detect the tag 30 which indicates that the hose clamp 52 is released to clamp the hose 50 to one of the base unit 18 and the first component 14. Therefore, the expected response, i.e., no tag 30 is detected, matches the actual response, i.e., no tag 30 is detected. With this outcome, the vehicle passes to the next station 28 and the reader 32 does not activate the indicator 64.

As an alternative outcome, the assembly line 12 can be stopped to stop the vehicle if the reader 32 detects the tag 30 which indicates that the hose clamp 52 has not been released. Therefore, for this outcome, the expected response, i.e., no tag 30 is detected, does not match the actual response, i.e., tag 30 is detected, and when this occurs, the reader 32 activates the indicator 64. By stopping the vehicle, further analysis of the location of the tag(s) 30 can be determined. For example, information retrieved from the tag(s) 30 can assist in locating the tag(s) 30. If utilizing the display 66, the display 66 can provide the information regarding the location of the clip(s) that have not been removed and the operator can then go to that location and remove the clip(s). If utilizing a different indicator 64, the operator can go to the vehicle and look for the clip(s) to be removed. Optionally, once the missed tag(s) 30 is/are removed, the reader 32 can rescan the vehicle and the reader 32 again compares between expected and actual responses.

Alternatively or in addition to confirming that the clips have been removed, the reader 32 can confirm that the expected components 14, 16 have been assembled together to create the desired vehicle. When the vehicle progresses through one or more stations 20, 28, the reader 32 can be positioned in a desired location to determine whether the components 14, 16 that have been coupled together to form the vehicle obtain the expected information. Generally again, the reader 32 can compare an expected response with an actual response and outputs an appropriate response.

The method can include comparing the actual response received by the reader 32 from scanning the vehicle with the expected response expected by the reader 32, and when the actual response matches the expected response, this is indicative of the appropriate first component 14 being coupled to that base unit 18, and that vehicle passes to the next station 28. For example, the reader 32 can confirm that the expected part identification or serial numbers of the various components 14, 16 match the components 14, 16 that are to be assembled to a specific vehicle. Therefore, scanning the vehicle via the reader 32 occurs after the station 20, and the vehicle passes to the next station 28 if the information of the tag 30 matches the information expected to be received via the reader 32 for that vehicle. In other words, if the expected response, i.e., expects part identification A, matches the actual response, i.e., the scanned component is identified as part identification A, then the vehicle passes to the next station 28. With this outcome, the vehicle passes to the next station 28 and the reader 32 does not activate the indicator 64.

As an alternative outcome, the assembly line 12 can be stopped to stop the vehicle if the reader 32 detects different information than expected from one or more tag(s) 30, which indicates that one or more components 14, 16 were to be assembled on a different vehicle. Therefore, for this outcome, the expected response, i.e., expects part identification A, does not match the actual response, i.e., the scanned component is identified as part identification B, and when this occurs, the reader 32 activates the indicator 64. By stopping the vehicle, further analysis of the location of the tag(s) 30 can be determined. For example, information retrieved from the tag(s) 30 can assist in locating the tag(s) 30. The display 66 can provide the information regarding the location of the tag(s) 30 for the component 14, 16 to be removed and replaced by the operator. Optionally, once the component(s) 14, 16 is/are replaced with the intended component for that vehicle, the reader 32 can rescan the vehicle and the reader 32 again compares between expected and actual responses.

Optionally, when the vehicle is fully assembled and ready for storage until being shipped, one or more readers 32 can be placed at the end of the assembly line 12 and the reader(s) 32 can retrieve and/or store all of the part identifications or serial numbers for that particular vehicle for historical records. This record storage option can be utilized on each vehicle assembled at the assembly plant 11.

It is to also be appreciated that the method discussed above can include other features not specifically identified in the method. Furthermore, the term "substantially" can refer to a slight imprecision or slight variance of a condition, quantity, value, or dimension, etc., some of which that are within manufacturing variance or tolerance ranges that can be subject to human error during installation.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A notification system for a vehicle assembly process at an assembly plant, the system comprising:
   a base unit of a vehicle located in the assembly plant;
   a first component coupled to the base unit at a station in the assembly plant to further define the vehicle;
   a tag coupled to one of the base unit and the first component;
   a reader disposed downstream from the station at the assembly plant and configured to detect if the tag is coupled to one of the base unit and the first component when the vehicle is scanned by the reader;
   wherein the tag includes a body that is configured as a clip; and
   a clamp coupled to one of the base unit and the first component, and wherein the clip holds the clamp open during coupling of the clamp to one of the base unit and the first component.

2. The system as set forth in claim 1:
   further including a hose coupled to one of the base unit and the first component to further define the vehicle;
   wherein the clamp is configured as a hose clamp that surrounds an end portion of the hose; and
   wherein the clip engages the hose clamp to hold the hose clamp open to connect the end portion of the hose to one of the base unit and the first component.

3. The system as set forth in claim 2 wherein the clip is removable from the hose clamp after connecting the end portion of the hose to cause the hose clamp to contract around the end portion of the hose and secure the hose to one of the base unit and the first component, and wherein a failure of the reader to detect the tag when the vehicle is scanned by the reader is indicative of the hose clamp being released to clamp the hose to one of the base unit and the first component.

4. The system as set forth in claim 2 wherein the hose clamp includes a pair of tabs and the clip includes a finger defining a recess that receives the tabs to hold the hose clamp open.

5. The system as set forth in claim 4 wherein the clip includes a handle for grasping to remove the clip from the hose clamp, with the finger extending outwardly away from the handle.

6. The system as set forth in claim 5:
wherein the tag includes a microchip configured to store information, and
wherein the microchip is embedded in at least one of the finger and the handle.

7. The system as set forth in claim 6 wherein the tag is a transponder, and the reader includes a transceiver that receives a signal when the microchip is detected.

8. The system as set forth in claim 1 wherein the reader includes an indicator that is activated if the reader detects the tag when the vehicle is being scanned by the reader.

9. The system as set forth in claim 8 wherein the reader includes a stand and an antenna being supported by the stand.

10. The system as set forth in claim 8 further including a computer in communication with the reader, and wherein the indicator is a display in communication with the computer to convey information regarding the tag.

11. The system as set forth in claim 1 wherein the tag and the reader communicate with each other utilizing radio frequency identification (RFID).

12. The system as set forth in claim 1 wherein the tag includes a microchip configured to store information, and the reader includes an antenna that receives a signal when the microchip is detected.

13. A method of notifying a user about a vehicle during a vehicle assembly process at an assembly plant, the method comprising:
providing a base unit of the vehicle as part of the vehicle assembly process at the assembly plant;
coupling a first component to the base unit at a station in the assembly plant to further assemble the vehicle;
coupling a tag to one of the base unit and the first component;
scanning the vehicle, via a reader that is disposed downstream from the station at the assembly plant, to detect if the tag is coupled to one of the base unit and the first component;
wherein the tag includes a body that is configured as a clip; and
the method further comprising coupling a clamp to one of the base unit and the first component as the clip holds the clamp open.

14. The method as set forth in claim 13 wherein coupling the tag to one of the base unit and the first component is further defined as coupling the tag to one of the base unit and the first component prior to coupling the first component to the base unit at the station.

15. The method as set forth in claim 13:
wherein the clamp is configured as a hose clamp;
further comprising engaging the clip with the hose clamp that surrounds an end portion of a hose to hold the hose clamp open; and
further comprising connecting the end portion of the hose to one of the base unit and the first component as the clip holds the hose clamp open.

16. The method as set forth in claim 15 further comprising removing the clip from the hose clamp after connecting the end portion of the hose to cause the hose clamp to contract around the end portion of the hose and secure the hose to one of the base unit and the first component.

17. The method as set forth in claim 16 wherein scanning the vehicle via the reader occurs after removing the clip from the hose clamp, and wherein a failure of the reader to detect the tag when the vehicle is being scanned by the reader is indicative of the hose clamp being released to clamp the hose to one of the base unit and the first component, and the vehicle passes to the next station.

18. The method as set forth in claim 13 wherein scanning the vehicle via the reader occurs after the station, and wherein the vehicle passes to the next station if the information of the tag matches the information expected to be received via the reader for that vehicle.

19. The method as set forth in claim 13 further comprising comparing an actual response received by the reader from scanning the vehicle with an expected response expected by the reader, and wherein the actual response matches the expected response is indicative of the appropriate first component being coupled to that base unit, and that vehicle passes to the next station.

20. A notification system for a vehicle assembly process at an assembly plant, the system comprising:
a base unit of a vehicle located in the assembly plant;
a first component coupled to the base unit at a station in the assembly plant to further define the vehicle;
a hose coupled to one of the base unit and the first component to further define the vehicle;
a hose clamp surrounding an end portion of the hose;
a tag includes a body configured as a clip, with the clip being engageable with the hose clamp to hold the hose clamp open;
wherein the clip is removable from the hose clamp after connecting the end portion of the hose to cause the hose clamp to contract around the end portion of the hose and secure the hose to one of the base unit and the first component;
a reader disposed downstream from the station at the assembly plant and configured to detect the tag; and
wherein a failure of the reader to detect the tag when the vehicle is scanned by the reader is indicative of the hose clamp being released to clamp the hose to one of the base unit and the first component.

* * * * *